(12) United States Patent
Klier

(10) Patent No.: US 9,008,363 B1
(45) Date of Patent: Apr. 14, 2015

(54) SYSTEM AND METHOD FOR COMPUTING OPTICAL FLOW

(71) Applicant: Google Inc., Mountain View, CA (US)

(72) Inventor: Peter Klier, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 291 days.

(21) Appl. No.: 13/732,462

(22) Filed: Jan. 2, 2013

(51) Int. Cl.
*G06K 9/00* (2006.01)
*G06T 7/20* (2006.01)

(52) U.S. Cl.
CPC .................................. *G06T 7/20* (2013.01)

(58) Field of Classification Search
USPC ........................................................ 382/103
See application file for complete search history.

(56) References Cited

U.S. PATENT DOCUMENTS

| | | | |
|---|---|---|---|
| 5,987,164 A | 11/1999 | Szeliski et al. | |
| 6,018,349 A | 1/2000 | Szeliski et al. | |
| 6,044,181 A | 3/2000 | Szeliski et al. | |
| 6,148,056 A | 11/2000 | Lin et al. | |
| 6,157,677 A | 12/2000 | Martens et al. | |
| 6,917,721 B2 | 7/2005 | Elad et al. | |
| 7,116,831 B2 | 10/2006 | Mukerjee et al. | |
| 7,317,839 B2 | 1/2008 | Holcomb | |
| 7,352,905 B2 | 4/2008 | Mukerjee et al. | |
| 7,620,109 B2 | 11/2009 | Srinivasan | |
| 7,715,589 B2 | 5/2010 | Freeman et al. | |
| 7,852,936 B2 | 12/2010 | Mukerjee et al. | |
| 8,064,520 B2 | 11/2011 | Mukerjee et al. | |
| 2005/0041842 A1* | 2/2005 | Frakes et al. ................... 382/128 |
| 2008/0232643 A1* | 9/2008 | Leichter et al. ............... 382/103 |
| 2009/0079876 A1 | 3/2009 | Takeshima et al. | |
| 2010/0124361 A1 | 5/2010 | Gaddy | |
| 2011/0050864 A1* | 3/2011 | Bond ............................... 348/51 |
| 2011/0063473 A1 | 3/2011 | Tsunekawa et al. | |
| 2011/0206236 A1* | 8/2011 | Center, Jr. ..................... 382/103 |
| 2012/0050074 A1 | 3/2012 | Bechtel et al. | |
| 2012/0148110 A1 | 6/2012 | Chen | |
| 2013/0176445 A1* | 7/2013 | Streeter et al. ............. 348/208.1 |

OTHER PUBLICATIONS

Aires et al., "Optical Flow Using Color Information: Preliminary Results", Proceedings of the 2008 ACM Symposium on Applied Computing, Mar. 16-20, 2008, Fortaleza, Ceara, Brazil, pp. 1607-1611.

Andrews et al., "Color Optical Flow", Proceedings of APRS Workshop on Digital Image Computing, Brisbane, Australia, vol. 1, Feb. 2003, pp. 135-139.

(Continued)

*Primary Examiner* — Shefali Goradia
(74) *Attorney, Agent, or Firm* — Dority & Manning, P.A.

(57) ABSTRACT

Systems and methods for computing optical flow are provided. One exemplary method includes obtaining four input color vectors respectively associated with four input pixels. The four input pixels are at four known input positions of an initial image. The method further includes obtaining a subject color vector associated with a subject pixel. The subject pixel is at a known subject position of a subsequent image. Inverse bilinear interpolation is performed for the subject color vector with respect to the four input color vectors to obtain an estimated position. An optical flow vector is formed from the estimated position to the known subject position. An exemplary system for forming a plurality of optical flow fields includes a computing device having a memory and a processor.

30 Claims, 7 Drawing Sheets

(56) References Cited

OTHER PUBLICATIONS

Barron et al., "Quantitative Color Optical Flow", Proceedings of the 16th International Conference on Pattern Recognition, Quebec, Canada, vol. 4, Aug. 11-15, 2002, pp. 251-255.

Golland et al., "Motion from Color", Computer Vision and Image Understanding, vol. 68, No. 3, Dec. 1997, pp. 346-362.

Li et al., "Learning for Optical Flow Using Stochastic Optimization", Proceedings of the $10^{th}$ European Conference on Computer Vision: Part II, Marseille, France, Oct. 12-18, 2008, pp. 379-391.

Mathews et al., "Module for Fixed Point Iteration and Newton's Method in 2D and 3D", http://math.fullerton.edu/mathews/n2003/FixPointNewtonMod.html, 9 pages.

Schoueri, "Optical Flow from Motion Blurred Color Images", Canadian Conference on Computer and Robot Vision, May 25-27, 2009, pp. 1-7.

\* cited by examiner

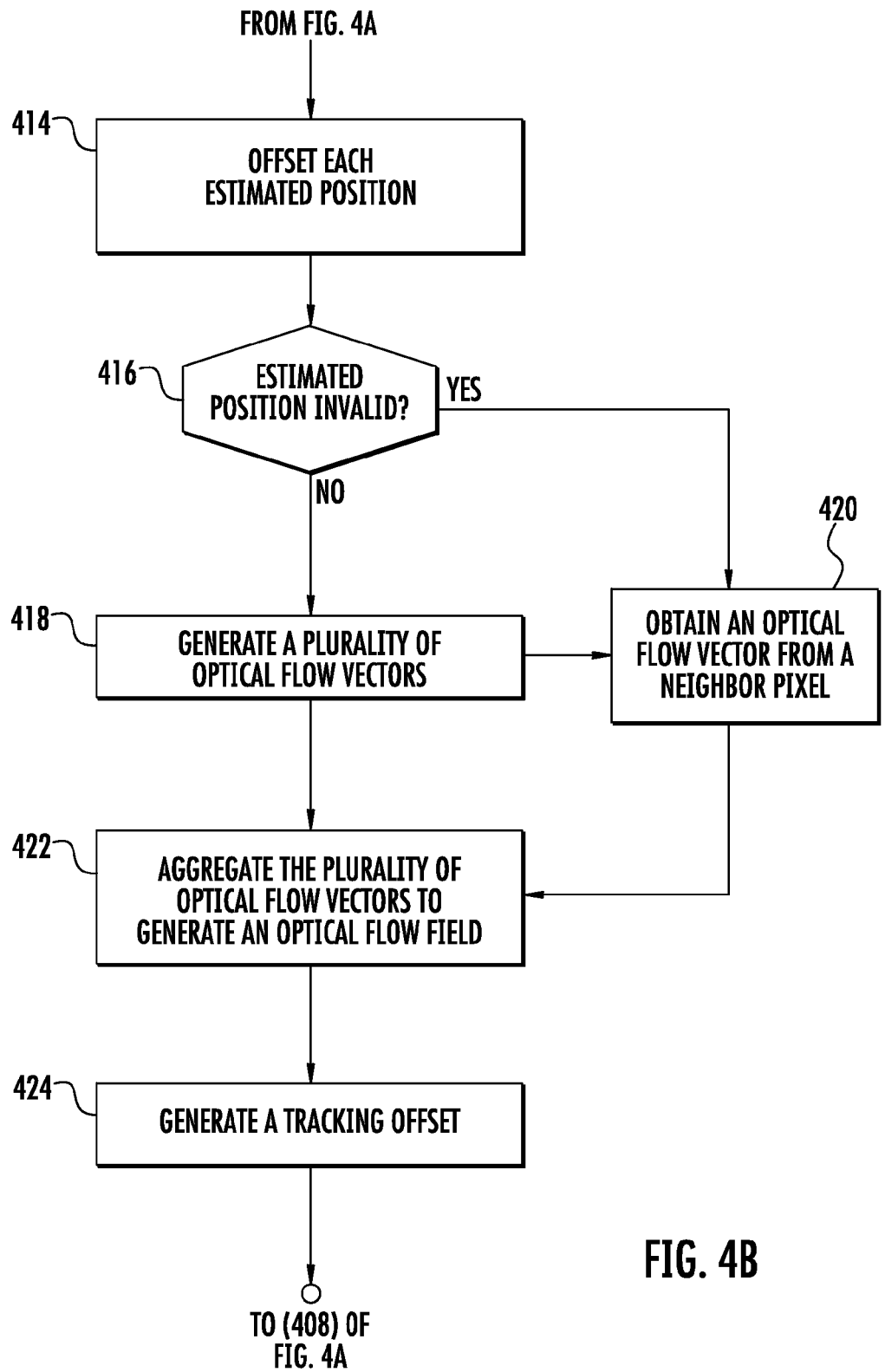

SYSTEM AND METHOD FOR COMPUTING OPTICAL FLOW

FIELD

The present disclosure relates generally to computing an optical flow over a series of two dimensional images. More particularly, the present disclosure relates to computing the optical flow associated with a pixel by performing inverse bilinear interpolation using the color of the pixel to obtain a two dimensional displacement.

BACKGROUND

A camera or other image capture device can observe a three dimensional scene and project such scene onto a detector such that a series of two dimensional images are created over time. When the camera and the scene are in relative motion, the two dimensional images can change over time. The problem of tracking each point in space using such changing two dimensional images is generally known as computing the optical flow.

For example, optical flow can generally refer to a change in x-axis position and a change in y-axis position for each point within a pair of two dimensional images. An optical flow vector can describe such change in x and change in y in vector form and an optical flow field can aggregate the optical flow vectors for each point in the images. Such optical flow fields can be computed over a series of sequential images and prove useful in numerous applications, including real-time applications.

Existing methods for computing optical flow have various starting points and characteristics. For example, the Lucas-Kanade method and its derivative works use assumptions about images in grayscale. In particular, the Lucas-Kanade method assumes that optical flow is essentially constant in a local neighborhood of pixels and solves a basic optical flow equation for all pixels in the neighborhood together in a single computation. However, by assuming constant flow over a neighborhood of pixels, the Lucas-Kanade method fails to consider subpixel or single pixel changes in optical flow. Further, determining optical flow over a neighborhood of pixels using a single calculation can be computationally demanding and reduce opportunities for computational parallelizability, making such method undesirable for real-time applications. In addition, the use of grayscale images ignores color as a source of informational truth.

Other methods for computing optical flow, such as the Horn-Schunck method, include an assumption or global constraint with respect to smoothness. As a result, such methods attempt to minimize distortions in flow and prefer solutions which exhibit higher levels of smoothness. However, such assumptions and preferences with respect to smoothness inherently defeat the use of optical flow for applications such as edge detection or object segmentation.

Therefore, a system and method for computing optical flow that prioritizes local information over global information, takes advantage of available truth information from color, and is appropriate for real-time applications is desirable.

SUMMARY

Aspects and advantages of the invention will be set forth in part in the following description, or may be obvious from the description, or may be learned through practice of the invention.

One exemplary aspect is directed to a computer-implemented method of forming an optical flow vector describing estimated displacement of a subject pixel from an initial image to a subsequent image. The method includes obtaining four input color vectors respectively associated with four input pixels. The four input pixels are at four known input positions of the initial image. The method further includes obtaining a subject color vector associated with the subject pixel. The subject pixel is at a known subject position of the subsequent image. Inverse bilinear interpolation is performed for the subject color vector with respect to the four input color vectors to obtain an estimated position. An optical flow vector is formed from the estimated position to the known subject position.

Other exemplary aspects are directed to systems, apparatus, devices, or non-transitory computer-readable media for forming a plurality of optical flow fields depicting optical flow with respect to a plurality of sequential images. One exemplary system includes a computing device having a memory and a processor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 4A and 4B depict a flow chart of an exemplary computer-implemented method for generating a plurality of optical flow fields according to an exemplary embodiment of the present disclosure.

DETAILED DESCRIPTION

Figure 1:
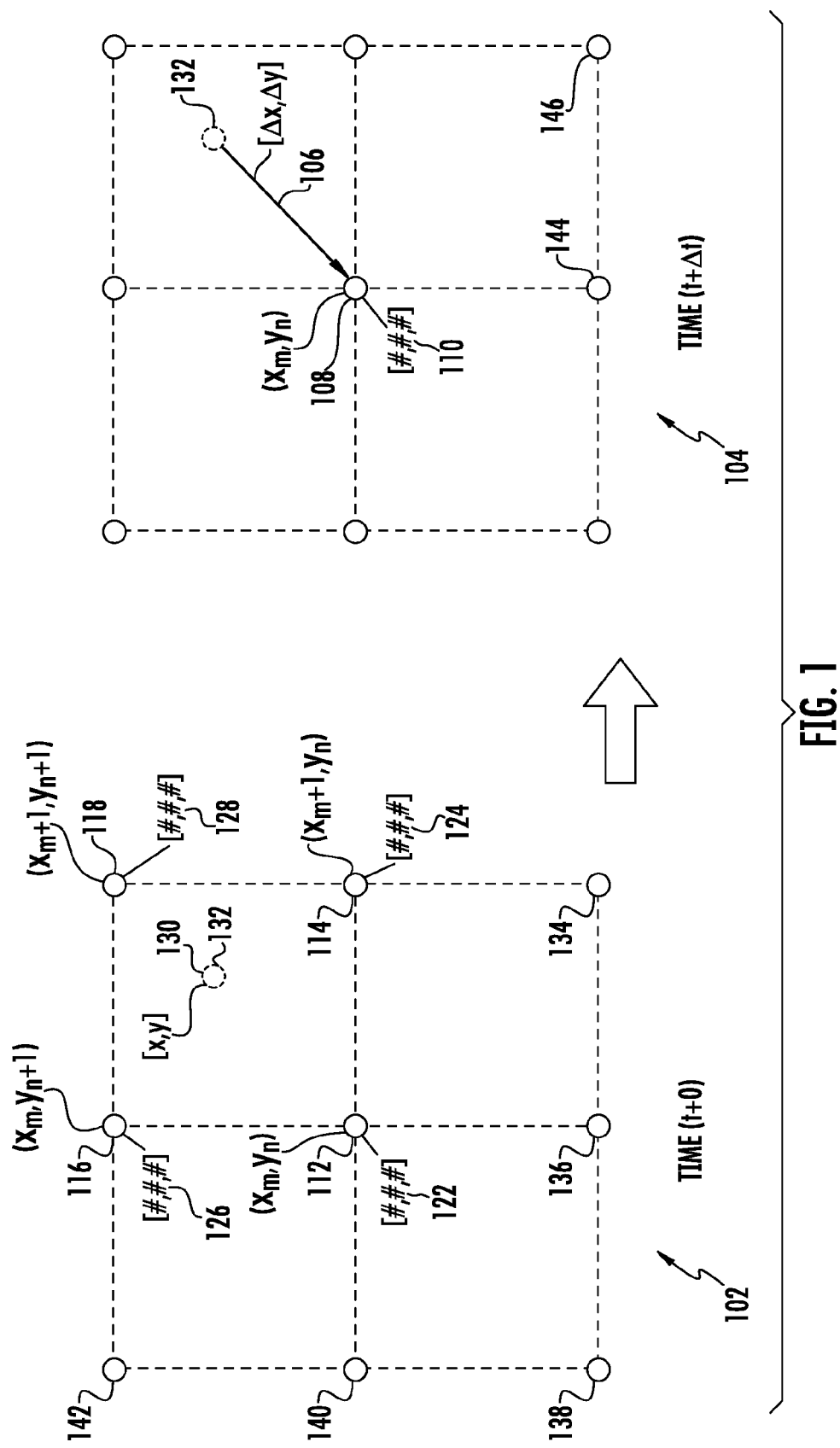
FIG. 1 depicts a pair of exemplary images and associated pixels according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

The present disclosure is generally directed to systems and methods for computing an optical flow over a series of two-dimensional images. In particular, inverse bilinear interpolation can be performed for a color of a subject pixel of a subsequent image with respect to four colors associated with four input pixels of an initial image. Performing inverse bilinear interpolation provides an estimated position of the subject pixel within the initial image. An optical flow vector can be formed from the estimated position to the position of the subject pixel in the subsequent image. Such an optical flow vector can describe the estimated displacement of the subject pixel from the initial image to the subsequent image.

More particularly, a subject pixel can reside at a known subject position of the subsequent image and an unknown position of the initial image. Therefore, the optical flow of the subject pixel from the initial image to the subsequent image can be initially unknown.

A subject color vector can be associated with the subject pixel. The subject color vector can have a plurality of components that describe the color of the subject pixel. For example, the subject color vector can have a red intensity component, a green intensity component, and a blue intensity component respectively describing the intensities of red, green, and blue which form the color of the subject pixel. As another example, the color vector can have an ultraviolet component, an infrared component, or other suitable components.

Inverse bilinear interpolation can be performed for the subject color vector with respect to at least four input color vectors of the initial image. The four input color vectors can respectively describe the colors of four input pixels at known locations of the initial image.

More particularly, inverse bilinear interpolation can be performed by minimizing a least-squares error equation. Such least-squares error equation can be minimized simultaneously solving a derivative of the least-squares error equation with respect to x and a derivative of the least-squares error equation with respect to y for zero.

In particular, a version of Newton's method in two dimensions can be used to solve for a variable position given the two derivative equations set to zero. More particularly, a second-derivative of each derivative equation with respect to x and with respect to y can yield four second-derivative equations that together form a Jacobian matrix. An exemplary algorithm can perform inverse bilinear interpolation by using such a Jacobian matrix to minimize the least-squares error equation.

Performing inverse bilinear interpolation in such fashion can result in computing an estimated position. Such estimated position can be the variable position solved for using Newton's method and can estimate the position of the subject pixel within the initial image. An optical flow vector can be formed from the estimated position to the known subject position of the subsequent image. Thus, the optical flow vector describes estimated displacement of the subject pixel from the initial image to the subsequent image.

Repeating the above described method for each pixel within the subsequent image results in a plurality of optical flow vectors that, when aggregated, form an optical flow field depicting total optical flow between the two images. Furthermore, repeating the above described method for each pixel within a plurality of sequential images can generate an optical flow field for each sequential image. The resulting plurality of optical flow fields can depict optical flow over a substantial length of time.

According to another aspect of the present disclosure, inverse bilinear interpolation can be performed for the subject color vector with respect to several sets of input color vectors. As an example, inverse bilinear interpolation can be respectively performed for the subject color vector with respect to input color vectors respectively associated with the four quadrants surrounding the subject pixel. Performing inverse bilinear interpolation multiple times for each subject pixel can result in a plurality of estimated positions that can be used to obtain a more accurate estimated position.

Other aspects of the present disclosure relate to variations of and additions to the above described methods. For example, error values, cross checking methods, or other suitable feedback can be produced to increase the accuracy of the resulting optical flow fields.

Further aspects of the present disclosure relate to systems for computing an optical flow. An exemplary system can include a data collection device, a network, and a computing device having a processor and a memory. The exemplary data collection device can include a sensor for collecting visual imagery information, including color information, and a network interface for communicating with the computing device over the network. The computing device can generate a plurality of optical flow fields for a series of images collected by the data collection device.

Exemplary Images and Associated Pixels

FIG. 1 depicts a pair of exemplary images and associated pixels according to an exemplary embodiment of the present disclosure. For instance, the pair of images can be an initial image 102 captured at time (t+0) and a subsequent image 104 captured at a later time (t+Δt). Each image can include a plurality of pixels that together form the image. Although FIG. 1 depicts the plurality of pixels respectively forming initial image 102 and subsequent image 104 as a plurality of circles, one of skill in the art, in light of the disclosures contained herein, will understand that such depiction is for the purposes of simplified illustration only. In particular, images 102 and 104 can include any suitable form of pixels. As an example, images 102 and 104 can include any suitable pixels with colors capable of being defined by any suitable color space, such as RGB, CMYK, HSV, YUV, RGB and infrared, RGB and ultraviolet, RGB and ultraviolet and infrared, or other suitable color spaces, including any combination of such spaces, whether trichromatic, tetrachromatic, or hyperspectral.

Subsequent image 104 can include a subject pixel 108. For example, subject pixel 108 can reside at a subject position, shown here as $(x_m, y_n)$, of subsequent image 104. A subject color vector 110 can be associated with subject pixel 108. Subject color vector 110 can have a plurality of components that describe the color of subject pixel 108. For example, subject color vector 110 can describe the color of subject pixel 108 according to any suitable color space, including RGB, CMYK, HSV, YUV, RGB and infrared, RGB and ultraviolet, RGB and ultraviolet and infrared, or other suitable color spaces, including any combination of such spaces, whether trichromatic, tetrachromatic, or hyperspectral. In one implementation, subject color vector 110 can have three components respectively associated with a red intensity component, a green intensity component, and a blue intensity component of the color of subject pixel 108. Further, subject color vector 110 can be of any suitable color depth.

Initial image 102 can include a plurality of input pixels. Shown in FIG. 1 are input pixels 112, 114, 116, 118, 134, 136, 138, 140, and 142. Input color vectors 122, 124, 126, and 128 can be respectively associated with input pixels 112, 114, 116, and 118. Input color vectors 122, 124, 126, and 128 can each have a plurality of components that respectively describe the colors of input pixels 112, 114, 116, and 118. As shown in FIG. 1, input pixels 112, 114, 116, and 118 can respectively reside at positions $(x_m, y_n)$, $(x_m+1, y_n)$, $(x_m, y_n+1)$, and $(x_m+1, y_n+1)$ of initial image 102.

Although input pixels 112, 114, 116, and 118 are shown in FIG. 1 as respectively residing at positions $(x_m, y_n)$, $(x_m+1, y_n)$, $(x_m, y_n+1)$, and $(x_m+1, y_n+1)$ of image 102, one of skill in the art, in light of the disclosures contained herein, will understand that such positions are provided by way of example only. As will be discussed further with respect to at least FIGS. 2A-C and 4A-B, input pixels residing at many various positions of initial image 102 can be used to determine an optical flow in satisfaction of the present disclosure.

According to an aspect of the present disclosure, an optical flow vector 106 can be formed. Optical flow vector 106 describes estimated displacement of subject pixel 108 from initial image 102 to subsequent image 104. For example, inverse bilinear interpolation can be performed for subject color vector 110 with respect to input color vectors 122, 124, 126, and 128. The result of such inverse bilinear interpolation can be an estimated position 132. Estimated position 132 can be an estimate of the position of subject pixel 108 in initial image 102. Optical flow vector 106 can be formed from estimated position 132 to the position of subject pixel 108 in subsequent image 104, shown in FIG. 1 as $(x_m, y_n)$.

One of skill in the art, in light of the disclosures contained herein, will appreciate that an optical flow vector can be formed or depicted in various ways. In particular, although the phrasing "formed from the estimated position to the position of the subject pixel in the subsequent image" is used herein, the present disclosure is not limited to such exemplary descriptive language. Generally, any optical flow vector that suitably describes displacement of the subject pixel over a pair of images, as estimated using inverse bilinear interpolation, can be used to satisfy the present disclosure.

Exemplary Method for Forming an Optical Flow Vector

Figure 2A:
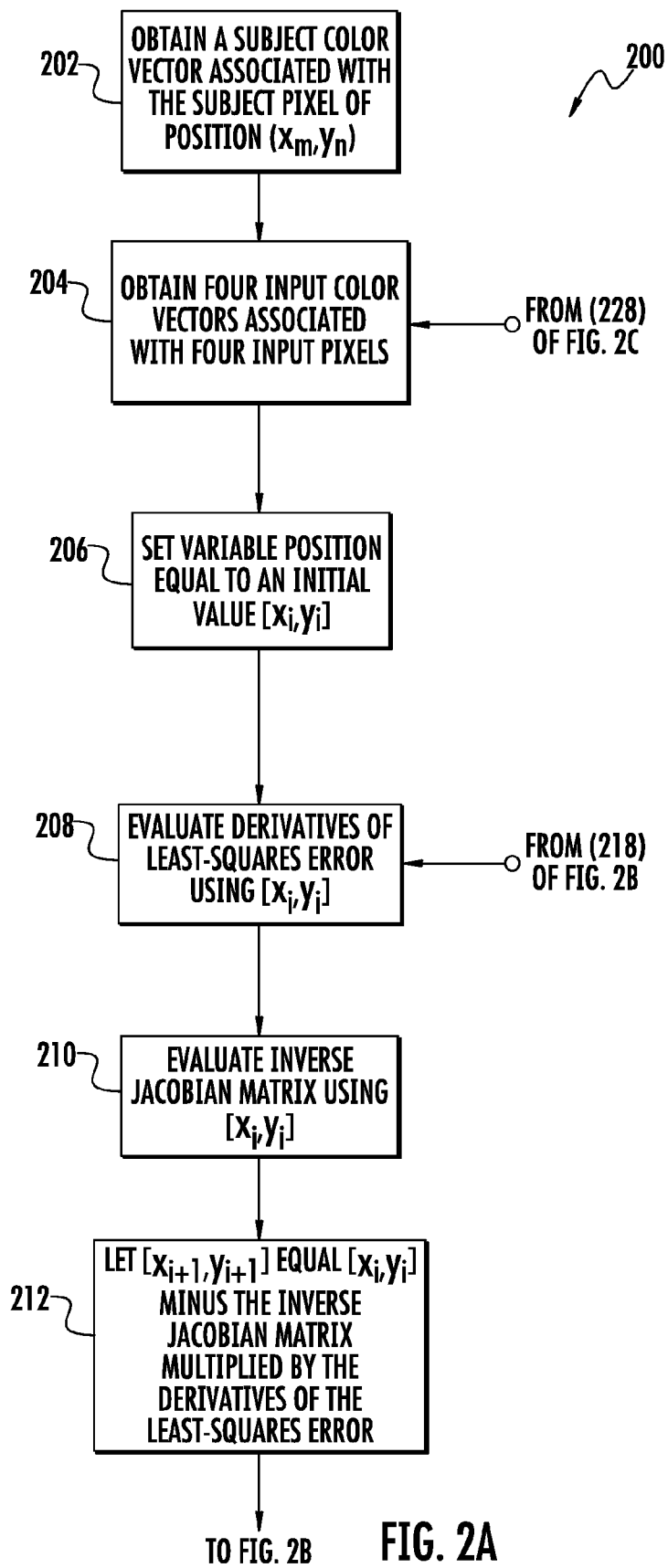
FIGS. 2A, 2B, and 2C depict a flow chart of an exemplary computer-implemented method for forming an optical flow vector according to an exemplary embodiment of the present disclosure.
Figure 2B:
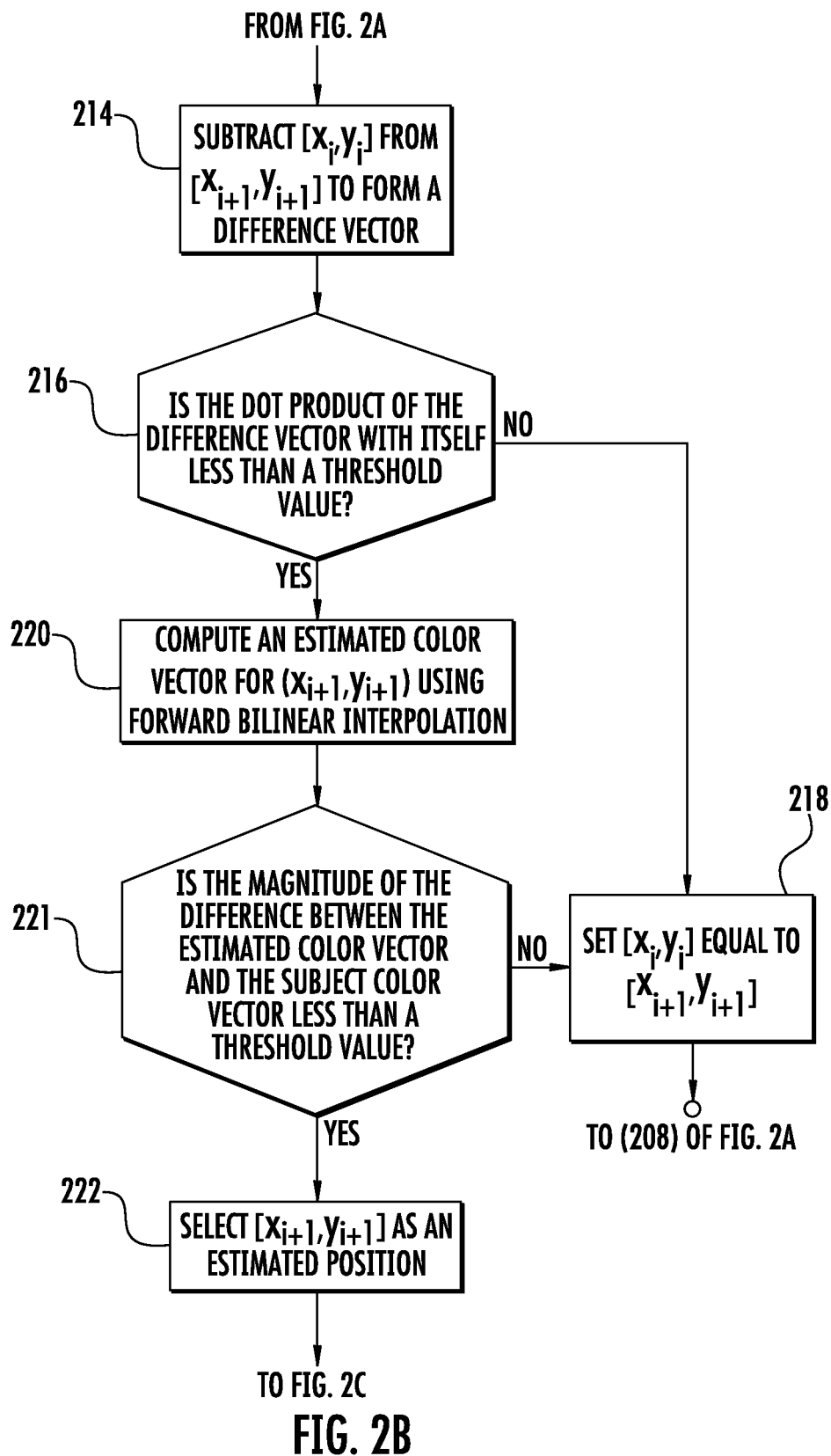
Figure 2C:
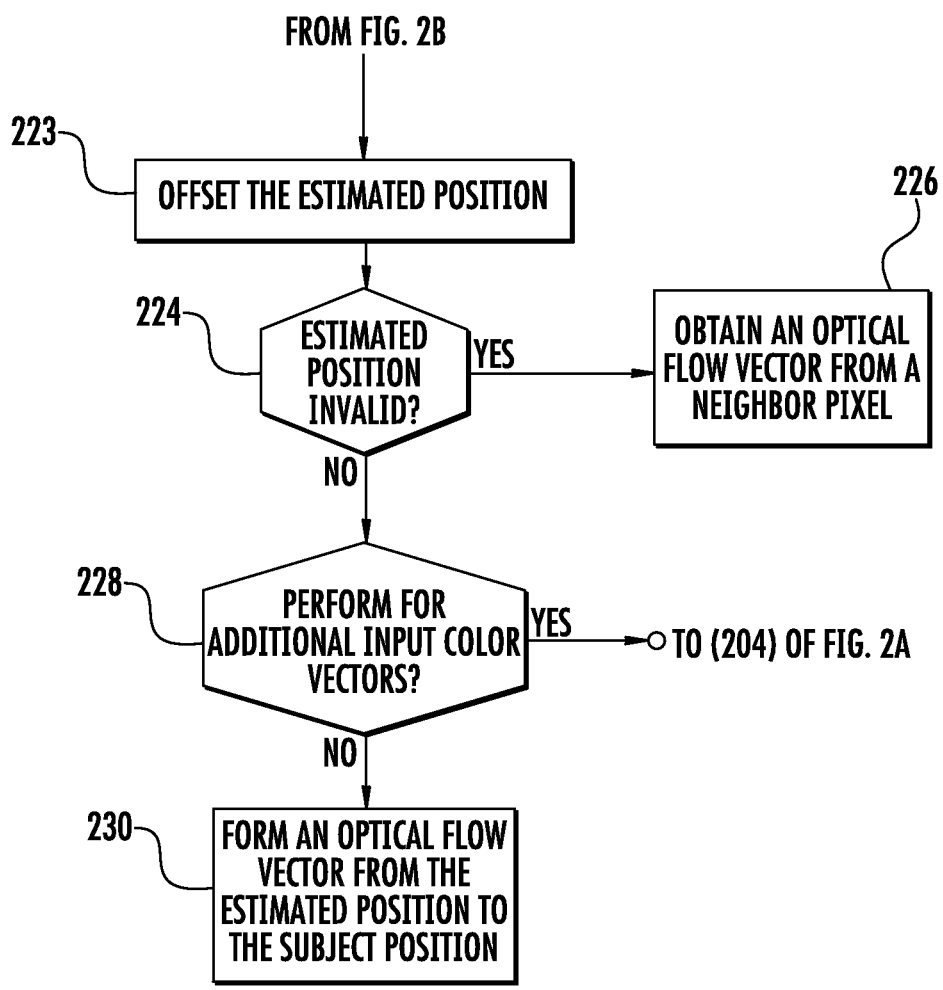

FIGS. 2A, 2B, and 2C depict a flow chart of an exemplary computer-implemented method (200) for forming an optical flow vector describing estimated displacement of a subject pixel over a pair of images according to an exemplary embodiment of the present disclosure. Although exemplary method (200) will be discussed with reference to the exemplary images depicted in FIG. 1, exemplary method (200) can be implemented using any suitable computing system, including system 300 of FIG. 3. In addition, although FIGS. 2A, 2B, and 2C depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

With reference to FIG. 2A, at (202) a subject color vector associated with a subject pixel can be obtained. For example, subject color vector 110 can have a plurality of components that describe the color of subject pixel 108 and can be obtained at (202). At (204) four input color vectors associated with four input pixels can be obtained. For example, input color vectors 122, 124, 126, and 128 can each have a plurality of components that respectively describe the colors of input pixels 112, 114, 116, and 118.

Although input color vectors 122, 124, 126, and 128 can be obtained at (204) to satisfy the present disclosure, such use is exemplary in nature and not intended to limit the scope of the disclosure to such input pixel positions. One of skill in the art, in light of the disclosures contained herein, will understand that four input color vectors associated with four input pixels of many various positions of image 102 can be used to form an optical flow vector. The only present requirement is that the four input pixels must be of such positions that bilinear interpolation is possible. In particular, such four input pixels need not be regularly spaced.

According to aspects of the present disclosure, inverse bilinear interpolation can be performed for the subject color vector obtained at (202) with respect to the four input color vectors obtained at (204) to obtain an estimated position. Such estimated position estimates the position of the subject pixel within the initial image.

More particularly, inverse bilinear interpolation can be performed for the subject color vector with respect to the four input color vectors by minimizing a least-squares error equation. The least-squares error equation can be derived by taking the dot product of an error function with itself. Such error function can compare the subject color vector with a bilinear interpolant by subtracting the subject color vector of the of the subject pixel from an estimated color vector produced by the bilinear interpolant. The bilinear interpolant can produce the estimated color vector by bilinearly interpolating the four input color vectors with respect to a variable position.

According to one implementation of the present disclosure, an algorithm can be used to minimize a least-squares error equation by simultaneously solving a derivative of the least-squares error equation with respect to x and a derivative of the least-squares error equation with respect to y for zero. In particular, the algorithm can iterate Newton's method in two dimensions to solve for variable position [x, y] using the following two derivatives of a least squares error equation that have been set to zero:

$$E_1(x,y) = 2(\vec{b}_1 + \vec{b}_2 x + \vec{b}_3 y + \vec{b}_4 xy - \vec{C}) \cdot (\vec{b}_2 + \vec{b}_4 y) = 0 \quad (1)$$

$$E_2(x,y) = 2(\vec{b}_1 + \vec{b}_2 x + \vec{b}_3 y + \vec{b}_4 xy - \vec{C}) \cdot (\vec{b}_3 + \vec{b}_4 x) = 0 \quad (2)$$

wherein $\vec{b}_1$ equals input color vector 122; $\vec{b}_2$ equals input color vector 124 minus input color vector 122; $\vec{b}_3$ equals input color vector 126 minus input color vector 122; $\vec{b}_4$ equals input color vector 122 minus input color vector 124 minus input color vector 126 plus input color vector 128; and $\vec{C}$ equals subject color vector 110. Variable position 130 provides an x-axis variable and a y-axis variable, here respectively represented by [x, y], that can be used to form the least squares error equation.

Steps (206)-(222) of FIGS. 2A and 2B provide an exemplary algorithm for iterating Newton's method to solve equations (1) and (2) for [x, y]. Such algorithm is exemplary in nature and not intended to limit the scope of the present disclosure to the particular steps of exemplary method (200). In particular, other methods of minimizing a suitable least-squares error equation can be used to satisfy the present disclosure. Furthermore, prior to discussing such exemplary method, the derivation of equations (1) and (2) will be set forth for the purposes of clarity.

An exemplary derivation of an exemplary least-squares error equation will now be discussed herein. One of skill in the art, in light of the disclosures provided herein, will understand that such derivation need not occur upon each instance of performing inverse bilinear interpolation, but is instead provided for clarity and a background regarding equations (1) and (2). In particular, the following derivation is not performed by an exemplary computing-system at run-time, but instead represents the mathematical foundation of the expressions that are used by an exemplary algorithm according to the present disclosure. As such, while the following derivation is not necessarily executed upon each performance of the present systems and methods for computing optical flow, one of skill in the art, in light of the disclosures contained herein, will appreciate that such derivation and associated equations are included within the scope of the present disclosure.

To form an exemplary least-squares error equation in accordance with an exemplary embodiment of the present disclosure, first, a bilinear interpolant can be formed based upon a variable position and the four input color vectors. The bilinear interpolant bilinearly interpolates the four input color vectors with respect to the variable position to provide an output color vector.

As an example, a bilinear interpolant can be formed based upon input color vectors 122, 124, 126, and 128 and variable position 130. Variable position 130 provides an x-axis variable and a y-axis variable, here respectively represented by [x, y], that can be used to form the bilinear interpolant. In the case that input color vectors 122, 124, 126, and 128 are used to form the bilinear interpolant, such bilinear interpolant can take the following form:

$$\vec{b}_1 + \vec{b}_2 x + \vec{b}_3 y + \vec{b}_4 xy \qquad (3)$$

wherein $\vec{b}_1$ equals input color vector 122; $\vec{b}_2$ equals input color vector 124 minus input color vector 122; $\vec{b}_3$ equals input color vector 126 minus input color vector 122; and $\vec{b}_4$ equals input color vector 122 minus input color vector 124 minus input color vector 126 plus input color vector 128. The bilinear interpolant of expression (3) outputs an estimated color vector for any variable position [x, y] by bilinearly interpolating input color vectors 122, 124, 126, and 128.

Although the bilinear interpolant has been presented here in the form of expression (3), one of skill in the art, in light of the disclosures contained herein, will recognize that the exact formulation of the bilinear interpolant is dependent upon the positions of the input pixels used to form the bilinear interpolant and, thus, will change when alternative input pixels are used as the basis for forming the bilinear interpolant. As such, the bilinear interpolant presented at (3) is exemplary in nature and not intended to limit the scope of the disclosure to only such formulation. Any bilinear interpolant which outputs an estimated color vector based upon bilinear interpolation of four input color vectors with respect to a variable position can be used to derive a suitable least-squares error equation.

Next, the subject color vector is subtracted from the bilinear interpolant to form an error function. For example, subject color vector 110 can be subtracted from the bilinear interpolant presented in expression (3) to form the following error function $\vec{E}(x, y)$:

$$\vec{E}(x,y) = \vec{b}_1 + \vec{b}_2 x + \vec{b}_3 y + \vec{b}_4 xy - \vec{C} \qquad (4)$$

wherein $\vec{C}$ equals subject color vector 110. Such error function provides an indication of the relative closeness of the output color vector of the bilinear interpolant for a given variable position [x, y] versus subject color vector 110.

A least-squares error equation can be formed by taking the dot product of the error function with itself. For example, taking the dot product of the error function presented in equation (4) with itself can form the following least-squares error equation:

$$\vec{E}(x,y) \cdot \vec{E}(x,y) \qquad (5)$$

According to aspects of the present disclosure, inverse bilinear interpolation can be performed for the subject color vector with respect to the four input color vectors by minimizing least-squares error equation (5). In one implementation, least-squares error equation (5) can be minimized by simultaneously solving a derivative of least-squares error equation (5) with respect to x and a derivative of least-squares error equation (5) with respect to y for zero.

For example, the least-squares error equation can be expanded to a sum of each of the color vector components. Such components can be differentiated separately and then returned to dot-product notation. As an example, in the particular case in which input color vectors 122, 124, 126, and 128 and subject color vector 110 each have three components respectively associated with a red intensity component, a green intensity component, and a blue intensity component, least-squares error equation (5) can be expanded to the following:

$$\vec{E}(x,y) \cdot \vec{E}(x,y) = e_{red}^2 + e_{green}^2 + e_{blue}^2 \qquad (6)$$

Differentiating each component separately and then returning to dot-product notation can provide the following two equations:

$$\partial/\partial x (\vec{E}(x,y) \cdot \vec{E}(x,y)) = 2\vec{E}(x,y) \cdot (\vec{b}_2 + \vec{b}_4 y) \qquad (7)$$

$$\partial/\partial y (\vec{E}(x,y) \cdot \vec{E}(x,y)) = 2\vec{E}(x,y) \cdot (\vec{b}_3 + \vec{b}_4 x) \qquad (8)$$

Setting equations (7) and (8) to zero provides the two derivatives of the least-squares error equation that can be solved for [x, y] using an exemplary algorithm in accordance with aspects of the present disclosure:

$$E_1(x,y) = 2(\vec{b}_1 + \vec{b}_2 x + \vec{b}_3 y + \vec{b}_4 xy - \vec{C}) \cdot (\vec{b}_2 + \vec{b}_4 y) = 0 \qquad (1)$$

$$E_2(x,y) = 2(\vec{b}_1 + \vec{b}_2 x + \vec{b}_3 y + \vec{b}_4 xy - \vec{C}) \cdot (\vec{b}_3 + \vec{b}_4 y) = 0 \qquad (2)$$

One of skill in the art, in light of the disclosures contained herein, will understand that various mathematical operations can be applied to the above provided equations and expressions without departing from the scope of the disclosure or affecting the mathematical outcome. For example, with regard to equations (1) and (2), the coefficient "2" can be eliminated since the equations are set to zero. As another example, the vectors $\vec{b}_1$ and $\vec{C}$ can be combined into a single vector, for example $\vec{D}$, since neither $\vec{b}_1$ nor $\vec{C}$ contain any variable components.

A local minimum of least-squares error equation (5) can be found by solving equations (1) and (2) for [x, y]. Such operation can be performed in a number of fashions, each of which can be used to satisfy the present disclosure. In one implementation, an exemplary algorithm iterates a version of Newton's method in two dimensions according to steps (206)-(222) of FIGS. 2A and 2B.

For example, referring now to FIG. 2A, at (206) the variable position [x, y] can be set equal to an initial value [$x_i$, $y_i$]. Such initial value [$x_i$, $y_i$] provides a first guess or estimate of the position of the subject pixel within the initial image. As an example, [$x_i$, $y_i$] can be set to [0, 0]. Setting variable position [x, y] to an initial value of [0, 0] provides an initial guess of zero optical flow. Other suitable initial values can be used according to various situations. For example, initial value [$x_i$, $y_i$] can correspond to an optical flow determined in a previous pair of images or according to a tracking offset.

At (208) the two derivatives of the least-squares error equation are evaluated using $[x_i, y_i]$. For example, equations (1) and (2) can be evaluated using $[x_i, y_i]$ such that the following equation is evaluated:

$$\vec{F}(x_i,y_i)=[E_2(x_i,y_i),E_2(x_i,y_i)]^T \quad (9)$$

At (210) an inverse Jacobian matrix of the two derivatives of the least-squares error equation can be evaluated using $[x_i, y_i]$. For example, an inverse Jacobian matrix of equations (1) and (2) can be evaluated using $[x_i, y_i]$ as follows:

$$J^{-1}(x_i, y_i) = \begin{pmatrix} \frac{\partial E_1(x_i, y_i)}{\partial x} & \frac{\partial E_1(x_i, y_i)}{\partial y} \\ \frac{\partial E_2(x_i, y_i)}{\partial x} & \frac{\partial E_2(x_i, y_i)}{\partial y} \end{pmatrix}^{-1} \quad (10)$$

where:

$$\partial/\partial x E_1(x_i,y_i)=(\vec{b}_2+\vec{b}_4 y_i)\cdot(\vec{b}_2+\vec{b}_4 y_i) \quad (11)$$

$$\partial/\partial y E_1(x_i,y_i)=(\vec{b}_3+\vec{b}_4 x_i)\cdot(\vec{b}_2+\vec{b}_4 y_i)+\vec{b}_4\cdot(\vec{b}_1+\vec{b}_2 x_i+\vec{b}_3 y_i+\vec{b}_4 x_i y_i-\vec{C}) \quad (12)$$

$$\partial/\partial x E_2(x_i,y_i)=(\vec{b}_2+\vec{b}_4 x_i)\cdot(\vec{b}_3+\vec{b}_4 x_i)+\vec{b}_4\cdot(\vec{b}_1+\vec{b}_2 x_i+\vec{b}_3 y_i+\vec{b}_4 x_i y_i-\vec{C}) \quad (13)$$

$$\partial/\partial y E_2(x_i,y_i)=(\vec{b}_3+\vec{b}_4 x_i)\cdot(\vec{b}_3+\vec{b}_4 x_i) \quad (14)$$

At (212) a second variable position $[x_{i+1}, y_{1+1}]$ can be set equal to $[x_i, y_i]$ minus the inverse Jacobian matrix evaluated at (210) multiplied by the derivatives of the least-squares error function evaluated at (208). For example, with respect to equations (9) and (10), the second variable position $[x_{i+1}, y_{i+1}]$ can be set according to the following equation at (212):

$$[x_{i+1},y_{i+1}]=[x_i,y_i]-J^{-1}(x_i,y_i)*[E_1(x_i,y_i),E_2(x_i,y_i)]^T \quad (15)$$

wherein [x, y] notation is used for a vector of two quantities and "*" represents matrix multiplication.

Referring now to FIG. 2B, at (214) $[x_i, y_i]$ can be subtracted from $[x_{i+1}, y_{i+1}]$ to form a difference vector. At (216) a dot product of the difference vector is taken with itself and compared with a first threshold value. If it is determined at (216) that the dot product of the difference vector with itself is not less than the first threshold value, then at (218) $[x_i, y_i]$ can be set equal to $[x_{i+1}, y_{i+1}]$ and the method will return to step (208) of FIG. 2A. In such fashion, steps (208)-(218) can be iteratively performed until the dot product of the difference vector with itself is less than the first threshold value.

If it is determined at (216) that the dot product of the difference vector with itself is less than the first threshold value, then at (220) an estimated color vector is computed for position $(x_{i+1}, y_{i+1})$. For example, traditional, "forward" bilinear interpolation can be performed with the four input color vectors with respect to position $[x_{i+1}, y_{i+1}]$ to obtain an estimated color vector. Such estimated color vector provides an estimate, based upon the four input color vectors, of the color of the pixel at position $(x_{i+1}, y_{i+1})$ in the initial image. The estimated color vector can be subtracted from the subject color vector at (220) to obtain a difference between the estimated color vector and the subject color vector. Such difference compares the estimated color vector to the subject color vector and can be used as an indicator of the general quality of position $(x_{i+1}, y_{i+1})$ as an estimate of the position of the subject pixel within the initial image.

At (221) the magnitude of the difference between the estimated color vector computed at (220) and the subject color vector is compared to a second threshold value. If it is determined at (221) that the magnitude of such difference is not less than the second threshold value, then method (200) can proceed to (218). At (218) $[x_i, y_i]$ can be set equal to $[x_{i+1}, y_{i+1}]$ and the method will return to step (208) of FIG. 2A. In such fashion, steps (208)-(221) can be iteratively performed until the magnitude of the difference between the estimated color vector computed at (220) and the subject color vector is less than the second threshold value.

If it is determined at (221) that the magnitude of the color difference is less than the second threshold value, then at (222) $[x_{i+1}, y_{i+1}]$ is selected as an estimated position. Such estimated position provides an estimate of the position of the subject pixel in the initial image. More particularly, such estimated position provides an estimate of the position of the subject pixel in the initial image with respect to the positions of the four input pixels associated with the four input color vectors obtained at (204).

Referring now to FIG. 2C, at (223) the estimated position is offset. More particularly, the estimated position selected at (222) provides an estimate of the location of the subject pixel in the initial image with respect to a reference frame defined by the input pixels associated with the input color vectors used to form the bilinear interpolant. Offsetting such estimated position can relate the estimated position to the subject position such that an optical flow vector can be formed.

In one implementation, the estimated position can be offset by adjusting the estimated position to a global frame such that an estimated global position of the subject pixel within the initial image is produced. For example, in the case that input color vectors 122, 124, 126, and 128 are used to form bilinear interpolant (3), then the estimated position can be offset by adding the subject position $[x_m, y_n]$ to the estimated position. Such offset estimated position provides an estimate of the global position of the subject pixel within the initial image.

One of skill in the art, in light of the disclosures provided herein, will appreciate that the offsetting discussed above is exemplary in nature. In general, any method that suitably relates the estimated position selected at (222) to the subject pixel such that an optical flow vector can be formed can be used to satisfy the present disclosure. In addition, in some instances in may not be necessary to offset the estimated position in order to form the optical flow vector.

At (224) it is determined whether the estimated position is invalid. For example, if performing any of the previous steps of FIGS. 2A, 2B, and 2C results in dividing by zero or outputs not a number (NaN), then the resulting estimated position selected at (222) can be determined to be invalid. As yet another example, if steps (208)-(221) have been performed for more iterations than a threshold number of iterations, then steps (208)-(221) can be interrupted (not shown) and the estimated position can be determined to be invalid at (224).

If the estimated position is determined to be invalid at (224), then at (226) an optical flow vector can be obtained from a pixel which neighbors the subject pixel. Many various methods for obtaining an optical flow vector associated with a neighbor pixel are possible and each can be used to satisfy the present disclosure. For example, with respect to FIG. 1, if an optical flow vector has already been formed with respect to an estimated displacement of neighbor pixel 144 or 146, then such optical flow vector can be obtained and associated with subject pixel 108.

As another example, an average of selected of the optical flow vectors of neighbor pixels can be obtained. Such average can be weighted according to factors such as color differences associated with the optical flow vectors or the similarity in color between the neighbor pixel and the subject pixel. As yet another example, if the present method is performed over a series of images, the optical flow vector computed for the pixel residing at the subject position in the previous image can be obtained.

Alternatively, if it is determined at (224) that the estimated position is invalid, then the method can proceed (not shown) to step (204) of FIG. 2A such that alternative or additional input color vectors are used. Using alternative input color vectors can provide a superior, valid result.

If it is determined at (224) that the estimated position is not invalid, then at (228) it is determined whether the previous steps of (204)-(224) should be performed for an additional set of input color vectors. For example, inverse bilinear interpolation can be performed for the subject color vector with respect to several sets of input color vectors. Performing inverse bilinear interpolation multiple times for a subject pixel can result in a plurality of estimated positions that can be used to obtain a more accurate final estimated position. If it is determined at (228) that steps (204)-(224) should be repeated for additional input color vectors, then the method proceeds to step (204) and an additional set of four input color vectors are obtained.

Such additional set of four input color vectors may share one or more elements with the first set of input color vectors. For example, according to one aspect of the present disclosure, steps (204)-(224) can be performed for four sets of input color vectors to obtain four estimated positions. More particularly, the four sets of input color vectors may include the input color vectors respectively associated with the following input pixel sets: {112, 114, 116, 118}; {112, 114, 134, 136}; {112, 136, 138, 140}; and {112, 140, 142, 116}. The sets presented here are exemplary in nature. In particular, steps (204)-(224) can be performed for any set of four input color vectors capable of being bilinearly interpolated.

If it is determined at (228) that steps (204)-(224) should not be performed for additional input color vectors, then at (230) an optical flow vector is formed from the estimated position to the subject position. For example, with reference to FIG. 1, optical flow vector 106 can be formed from estimated position 132 to the position of subject pixel 108, shown here as subject position $(x_m, y_n)$. Optical flow vector 106 describes the estimated displacement of subject pixel 108 from initial image 102 to subsequent image 104.

If additional iterations of steps (204)-(224) have been performed with respect to additional input color vectors per a determination at (228), then at (230) the optical flow vector can be formed from a final estimated position to the subject position. As an example, in the case that inverse bilinear interpolation was performed with respect to a plurality of sets of input color vectors, the resulting plurality of estimated positions can be averaged to form the final estimated position. Such average can include a weighting factor that is generally inversely proportional to the color difference associated with each of the plurality of estimated positions.

As another example, the estimated position that provides the best fit can be selected as the final estimated position. For example, with reference to FIG. 1, in the case that inverse bilinear interpolation was performed for subject color vector 110 with respect to input color vectors respectively associated with four quadrants formed by the following input pixel sets or quadrants: {112, 114, 116, 118}; {112, 114, 134, 136}; {112, 136, 138, 140}; and {112, 140, 142, 116}; then the estimated position that results from inverse bilinear interpolation using the input color vectors associated with the quadrant receiving the most selections as the quadrant in which the subject pixel resides in the initial image can be selected as the final estimated position. For example, if estimated position 132 is consistently located within the upper right quadrant according to inverse bilinear interpolation of four set of input color vectors, then the estimated position resulting from inverse bilinear interpolation using input color vectors 122, 124, 126, and 128 can be selected as the final estimated position.

One of skill in the art, in light of the disclosures contained herein, will understand that exemplary method (200) can be performed for each of a plurality of pixels within the subsequent image. For example, exemplary method (200) can be performed for each of pixels 108, 144, and 146 of subsequent image 104. Performing exemplary method (200) in such fashion can result in a plurality of optical flow vectors that can be aggregated to form an optical flow field depicting the total optical flow from initial image 102 to subsequent image 104.

In addition, exemplary method (200) can be performed for each pixel within a plurality of sequential images such that a plurality of optical flow fields are created. Such plurality of optical flow fields can depict optical flow over a substantial length of time and can be used, for example, to detect edges in real-time applications or for any other purpose or application for which optical flow can be used.

Exemplary System for Generating Optical Flow Fields

Figure 3:
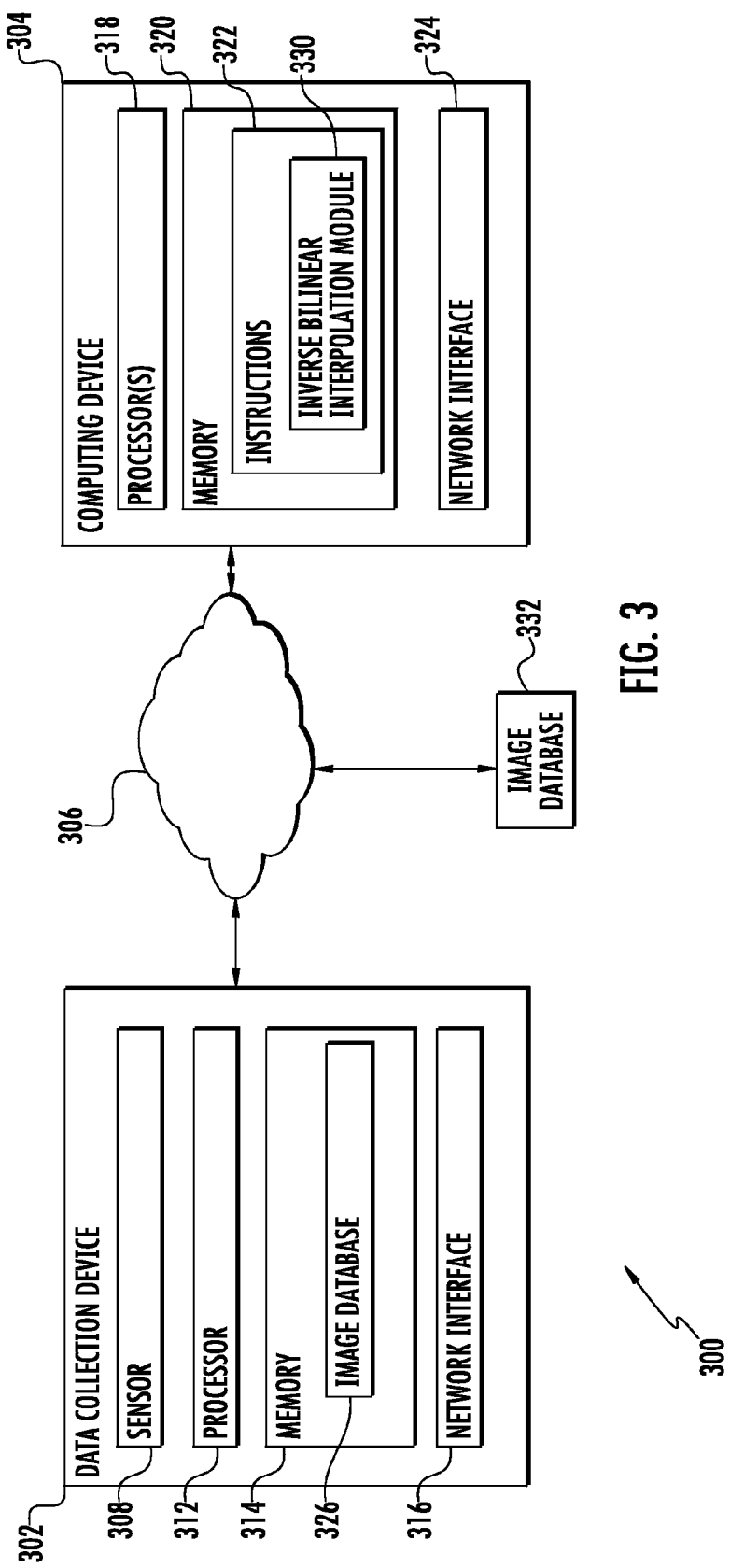
FIG. 3 depicts an exemplary computer-based system for generating a plurality of optical flow fields according to an exemplary embodiment of the present disclosure.

FIG. 3 depicts an exemplary computer-based system 300 for generating a plurality of optical flow fields depicting optical flow with respect to a plurality of sequential images. System 300 can include a data collection device 302 and a computing device 304. Data collection device 302 can include a sensor 308, a processor 312, a memory 314 and a network interface 316. Data collection device 302 can transmit data to or otherwise communicate with computing device 304 over a network 306 via network interface 316. Network 306 can be a LAN, WAN, or other suitable network and can include any number of wired or wireless links.

In one implementation, data collection device 302 can be an opto-mechanical device such as a camera and sensor 308 can be configured to sense and collect visual imagery information, including color information. The visual imagery information collected by sensor 308 can be processed by processor 312 and stored in an image database 326 of memory 314. Such visual imagery can be stored in any format, including video and image formats. As an example, processor 312 can generate a plurality of sequential images containing a plurality of pixels and store such images in image database 326.

Data collection device 302 can be configured to measure the color contained within the visual imagery information and generate a plurality of color vectors based upon the measurement. Each color vector can be associated with a pixel and can have a plurality of components describing the color of the pixel. In one implementation, such functionality can be performed by components of sensor 308 or processor 312. Data collection device 302 can generate a plurality of color vectors describing pixel colors according to any suitable color space, including RGB, CMYK, HSV, YUV, RGB and infrared, RGB and ultraviolet, RGB and ultraviolet and infrared, or other suitable color spaces, including any combination of such spaces, whether trichromatic, tetrachromatic, or hyperspectral. In addition, data collection device 302 can generate color vectors according to any suitable color depth. The color vectors associated with each pixel can be stored in image database 326.

Computing device 304 can include a processor 318, memory 320, and network interface 324. Processor 318 can be one processor or can be a plurality of processors which are operably connected. Processor 318 can be configured to convert a color vector from one color space to another. Memory 320 can store instructions 322 which cause the processor to perform operations. For instance, memory 320 can store instructions 322 to implement one or more modules. Such modules can include an inverse bilinear interpolation module 330 for performing inverse bilinear interpolation for a subject color vector with respect to four input color vectors. Memory 320 can also include or be in communication with one or more databases such as image database 332. Computing device 304 is operable to communicate over network 306 using network interface 324.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer.

System 300 can be configured to generate a plurality of optical flow fields depicting optical flow with respect to a plurality of sequential images. For example, data collection device can generate a plurality of sequential images including a plurality of pixels. A plurality of color vectors can be respectively associated with the plurality of pixels. The plurality of sequential images can be transmitted from data collection device 302 to computing device 304 over network 306. Computing device 304 can be configured to generate the plurality of optical flow fields by performing exemplary method (400).

Exemplary Method for Generating a Plurality of Optical Flow Fields

Figure 4A:
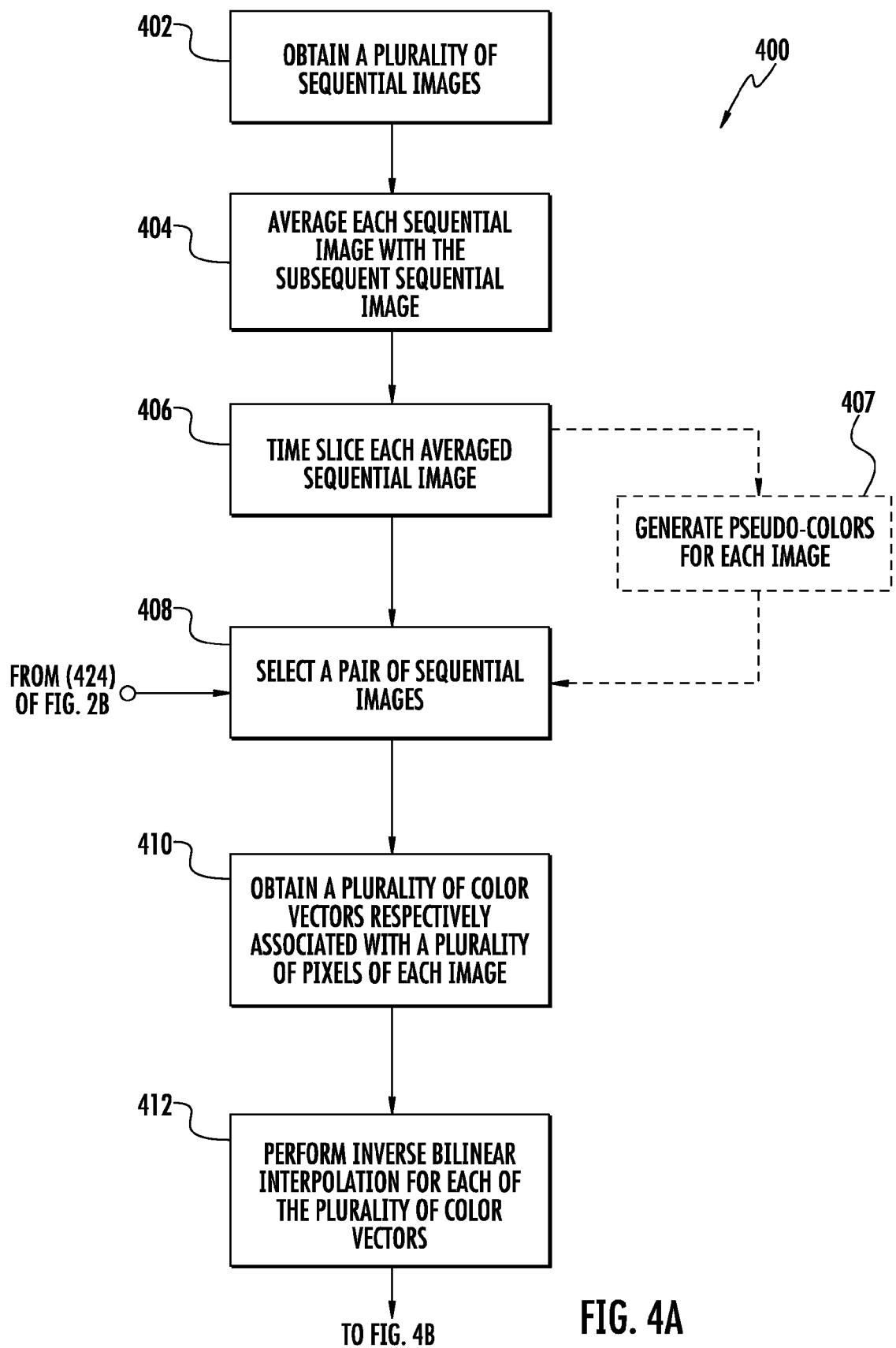

FIGS. 4A and 4B depict a flow chart of an exemplary computer-implemented method (400) for generating a plurality of optical flow fields according to an exemplary embodiment of the present disclosure. Although exemplary method (400) will be discussed with reference to exemplary system 300 of FIG. 3, exemplary method (400) can be implemented using any suitable computing system. In addition, although FIGS. 4A and 4B depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 4A, at (402) a plurality of sequential images are obtained. For example, data collection device 302 can generate a plurality of sequential images based upon visual imagery information collected by sensor 308. Such images can be stored in image database 326 or transmitted to computing device 304 over network 306 in real-time. As another example, computing device 304 can obtain a plurality of sequential images from image database 332. For example, image database 332 can store a plurality of sequential images in the form of user-uploaded videos.

At (404) each sequential image is averaged with the subsequent or previous sequential image such that a plurality of averaged sequential images are formed. For example, processor 318 of computing device 304 can perform operations which average each pair of the plurality of sequential images. Averaging each pair of the plurality of sequential images in such fashion can blur the motion captured within the plurality of sequential images.

At (406) each averaged sequential image is time sliced. As an example, if the plurality of sequential images imported by computing device 304 from image database 332 correspond to the frames of a 30 Hz video, processor 318 can time slice such 30 Hz frames to produce 300 Hz video frames. Time slicing can be accomplished by weighted averaging or other suitable methods. Time slicing the averaged sequential images in such fashion can reduce the per image optical flow and, as a result, increase the accuracy of the optical flow fields.

Other suitable forms of image preprocessing can be used in addition to the steps included in exemplary method (400). For example, pixel size can be increased outside the center of the image or outside a tracking zone. As another example, spatial blurring or defocusing can be applied to each image to further reduce optical flow on a per-pixel basis. The scope of the present disclosure includes the use of any suitable image processing techniques.

As another example of suitable image preprocessing, at (407) a plurality of pseudo-color values can be generated for each image. More particularly, each group of four pixels within an image can be multiplied by a plurality of pseudo-color conversion matrices and converted into a single pixel with a color vector containing a plurality of pseudo-color values. For example, a grayscale image of resolution 1024×1024 can be converted into a pseudo-color image of resolution 512×512 by converting each grouping of four pixels within the grayscale image into a single pseudo-color pixel. In particular, the grayscale values respectively associated with each grouping of four pixels within the grayscale image can be multiplied, element-wise, by the following orthogonal pseudo-color conversion matrices:

$$\begin{bmatrix} 1 & 1 \\ 1 & 1 \end{bmatrix} \quad (15)$$

$$\begin{bmatrix} -1 & -1 \\ 1 & 1 \end{bmatrix} \quad (16)$$

$$\begin{bmatrix} 1 & -1 \\ 1 & -1 \end{bmatrix} \quad (17)$$

$$\begin{bmatrix} 1 & -1 \\ -1 & 1 \end{bmatrix} \quad (18)$$

wherein matrices (15)-(18) respectively represent luminosity, tip, tilt, and astigmatism. After such element-wise multiplication, the values can be respectively summed to produce a single pixel with a color vector including four pseudo-color values. Although a factor of two is sacrificed in each dimension with regard to resolution, such use of pseudo-color conversion matrices generates an image containing color vectors suitable for use with the present disclosure from grayscale images.

In certain situations it may be desirable to multiply each grouping of four pixels by only matrices (15), (16), and (17) such that the resulting color vector includes three pseudo-color values. In addition, the use of pseudo-color conversion matrices is not limited to grayscale images and can be applied to images within a color space, such as RGB, to produce nine or twelve pseudo-color values.

Returning to FIG. 4A, at (408) a pair of sequential images are selected. For example, the first and second images in the series of sequential images time sliced at (406) can be selected. The first image can be an initial image and the second image can be a subsequent image.

At (410) a plurality of color vectors respectively associated with the plurality of pixels of each image are obtained. For example, each of the plurality of pixels can have an associated color vector that describes the color of the pixel. Such color vectors can be obtained at (410).

At (412) inverse bilinear interpolation is performed for each of the plurality of color vectors of the second image obtained at (402). More particularly, inverse bilinear interpolation can be respectively performed for each color vector associated with each pixel of the second image obtained at (402) with respect to at least four of the plurality of color vectors of the first image obtained at (402). Performing inverse bilinear interpolation for each color vector of the second image will produce a plurality of estimated positions that respectively estimate the positions of each pixel of the second image within the first image.

For example, processor 318 can implement inverse bilinear interpolation module 330 to perform inverse bilinear interpolation for each color vector of the second image with respect to at least four of the plurality of color vectors of the first image obtained at (402). In one implementation, such inverse bilinear interpolation can be performed in accordance with exemplary method (200) of FIGS. 2A, 2B, and 2C.

Referring now to FIG. 4B, at (414) the plurality of estimated positions are respectively offset. For example, the plurality of estimated positions obtained at (412) can respectively estimate the position of an associated pixel within the first image with respect to a reference frame defined by the at least four color vectors used to perform bilinear interpolation for such associated pixel. Offsetting the plurality of estimated positions can respectively relate the plurality of estimated positions to the position of the associated pixel in the second image, such that a plurality of optical flow vectors can be formed. As discussed above, such offsetting is a matter of convenience, can be performed in a number of ways, and may not be necessary in certain circumstances.

At (416) each estimated position is analyzed to determine whether it is invalid. For example, if performing step (412) results in dividing by zero or returns not a number (NaN) for any pixel, then the resulting estimated position associated with such pixel can be determined to be invalid. As yet another example, if performing step (412) results in iterating Newton's method in two dimensions for more than a threshold number of iterations for any pixel, then the resulting estimated position associated with such pixel can be determined to be invalid.

At (418) a plurality of optical flow vectors are generated. For all pixels whose estimated position was not determined to be invalid at (416), the optical flow vector can be formed from the estimated position to the position of the pixel in the second image.

For pixels whose estimated position was determined to be invalid at (416), an optical flow vector can be obtained from a neighbor pixel at (420). Many various methods for obtaining an optical flow vector associated with a neighbor pixel are possible and each can be used to satisfy the present disclosure. For example, the optical flow vector obtained at (420) can have been generated at (418) with respect to a neighbor pixel. As another example, an average of selected of the optical flow vectors of neighbor pixels can be obtained. Such average can be weighted according to factors such as color differences associated with the optical flow vectors or the similarity in color between the neighbor pixel and the subject pixel. As yet another example, if the present method is performed over a series of images, the optical flow vector computed for the pixel residing at the subject position in the previous image can be obtained.

At (422) the plurality of optical flow vectors generated at (418) or obtained at (420) are aggregated to generate an optical flow field. Such optical flow field can include optical flow vectors associated with each pixel of the second image and, therefore, depict total optical flow from the first image to the second.

At (424) a tracking offset can be generated. For instance, the optical flow field generated at (422) can be used as a tracking offset for the next iteration of method (400) over a next pair of images. For example, such tracking offset can be used to preliminarily adjust the coordinate locations of all pixels in an image, such that optical flow is reduced. As another example, such tracking offset can be used to inform method (400) when selecting input color vectors with which to perform inverse bilinear interpolation at (412). As yet another example, the tracking offset can be taken into account when forming optical flow vectors with respect to a subsequent pair of images.

Such tracking offset can also be used in real-time applications. For example, the tracking offset can be used to physically adjust a camera or other suitable data collection device in angular space. In particular, the position of data collection device 302 of FIG. 3 can be adjusted based on the tracking offset. As another example, the tracking offset can be used to computationally shift each of the plurality of sequential images such that optical flow is reduced.

Returning to FIG. 4B, once the tracking offset has been generated at (424), then method (400) can proceed back to (408) of FIG. 4A and the next pair of images can be selected. For example, the next pair of images can be the second and the third images in the plurality of time sliced images. Performing method (400) in such iterative fashion generates a plurality of optical flow fields respectively depicting optical flow from each sequential image to the next sequential image. Such plurality of optical flow fields can depict optical flow over a substantial length of time.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of forming an optical flow vector describing estimated displacement of a subject pixel from an initial image to a subsequent image, the method comprising:

obtaining four input color vectors respectively associated with four input pixels at four known input positions of the initial image;

obtaining a subject color vector associated with the subject pixel, the subject pixel residing at a known subject position of the subsequent image;

performing inverse bilinear interpolation for the subject color vector with respect to the four input color vectors to obtain an estimated position; and forming the optical flow vector from the estimated position to the known subject position.

2. The method of claim 1, wherein performing inverse bilinear interpolation for the subject color vector with respect to the four input color vectors to obtain an estimated position comprises minimizing a least-squares error equation, the least squares error equation comprising the dot product of an error function with itself, the error function comprising the subject color vector subtracted from a bilinear interpolant, the bilinear interpolant bilinearly interpolating the four input color vectors with respect to a variable position.

3. The computer-implemented method of claim 2, wherein minimizing a least-squares error equation comprises simultaneously solving a derivative of the least-squares error equation with respect to x and a derivative of the least-squares error equation with respect to y for zero.

4. The computer-implemented method of claim 3, wherein Newton's method is iterated in two dimensions to simultaneously solve the derivative of the least-squares error equation with respect to x and the derivative of the least-squares error equation with respect to y for zero.

5. The computer-implemented method of claim 1, wherein each of the subject color vector and the four input color vectors comprises three components respectively associated with a red intensity component, a green intensity component, and a blue intensity component.

6. The computer-implemented method of claim 1, wherein each of the subject color vector and the four input color vectors comprises at least three pseudo-color components respectively obtained by multiplying, element-wise, and summing over the elements a grouping of four preprocessing pixels by at least three pseudo-color conversion matrices.

7. The computer-implemented method of claim 1, wherein:
the four input pixels comprise pixels at positions $(x_m, y_n)$, $(x_{m+1}, y_n)$, $(x_m, y_{n+1})$, and $(x_{m+1}, y_{n+1})$ of the initial image; and
the subject pixel comprises a pixel at position $(x_m, y_n)$ of the subsequent image.

8. The computer-implemented method of claim 7, wherein performing inverse bilinear interpolation for the subject color vector with respect to the four input color vectors to obtain an estimated position comprises:
solving two derivatives of a least-squares error equation for the variable position, the variable position comprising [x, y], the two derivatives of the least-squares error equation comprising:

$$E_1(x,y) = 2(\vec{b}_1 + \vec{b}_2 x + \vec{b}_3 y + \vec{b}_4 xy - \vec{C}) \cdot (\vec{b}_2 + \vec{b}_4 y) = 0$$

$$E_2(x,y) = 2(\vec{b}_1 + \vec{b}_2 x + \vec{b}_3 y + \vec{b}_4 xy - \vec{C}) \cdot (\vec{b}_3 + \vec{b}_4 x) = 0$$

wherein:
$\vec{b}_1$ equals the input color vector associated with the input pixel at position $(x_m, y_n)$;
$\vec{b}_2$ equals the input color vector associated with the input pixel at position $(x_{m+1}, y_n)$ minus the input color vector associated with the input pixel at position $(x_m, y_n)$;
$\vec{b}_3$ equals the input color vector associated with the input pixel at position $(x_m, y_{n+1})$ minus the input color vector associated with the input pixel at position $(x_m, y_n)$;
$\vec{b}_4$ equals the input color vector associated with the input pixel at position $(x_m, y_n)$ minus the input color vector associated with the input pixel at position $(x_{m+1}, y_n)$ minus the input color vector associated with the input pixel at position $(x_m, y_{n+1})$ plus the input color vector associated with the input pixel at position $(x_{m+1}, y_{n+1})$; and
$\vec{C}$ equals the subject color vector.

9. The computer-implemented method of claim 8, wherein solving the two derivatives of the least-squares error equation for the variable position [x, y] comprises iterating the following equation:

$$[x_{i+1}, y_{i+1}] = [x_i, y_i] - J^{-1}(x_i, y_i) * [E_1(x_i, y_i), E_2(x_i, y_i)]^T$$

wherein "*" represents matrix multiplication and $J^{-1}(x_i, y_i)$ is the inverse of the following Jacobian matrix:

$$\begin{pmatrix} \frac{\partial E_1(x_i, y_i)}{\partial x} & \frac{\partial E_1(x_i, y_i)}{\partial y} \\ \frac{\partial E_2(x_i, y_i)}{\partial x} & \frac{\partial E_2(x_i, y_i)}{\partial y} \end{pmatrix}$$

wherein:

$$\partial/\partial x E_1(x_i, y_i) = (\vec{b}_2 + \vec{b}_4 y_i) \cdot (\vec{b}_2 + \vec{b}_4 y_i)$$

$$\partial/\partial y E_1(x_i, y_i) = (\vec{b}_3 + \vec{b}_4 x_i) \cdot (\vec{b}_2 + \vec{b}_4 y_i) + \vec{b}_4 \cdot (\vec{b}_1 + \vec{b}_2 x_i + \vec{b}_3 y_i + \vec{b}_4 x_i y_i - \vec{C})$$

$$\partial/\partial x E_2(x_i, y_i) = (\vec{b}_2 + \vec{b}_4 x_i) \cdot (\vec{b}_3 + \vec{b}_4 x_i) + \vec{b}_4 \cdot (\vec{b}_1 + \vec{b}_2 x_i + \vec{b}_3 y_i + \vec{b}_4 x_i y_i - \vec{C})$$

$$\partial/\partial y E_2(x_i, y_i) = (\vec{b}_3 + \vec{b}_4 x_i) \cdot (\vec{b}_3 + \vec{b}_4 x_i).$$

10. The computer-implemented method of claim 1, further comprising offsetting the estimated position to relate the estimated position to the subject position prior to forming the optical flow vector from the estimated position to the known subject position.

11. The computer-implemented method of claim 1, further comprising:
determining if the estimated position is an invalid result of dividing by zero or is not a number; and
obtaining an optical flow vector associated with a neighbor pixel when the estimated position is an invalid result of dividing by zero or is not a number.

12. The computer-implemented method of claim 1, wherein performing inverse bilinear interpolation for the subject color vector with respect to the four input color vectors to obtain an estimated position comprises:
performing bilinear interpolation with the four input color vectors and the estimated position to obtain an estimated color vector;
subtracting the estimated color vector from the subject color vector to obtain a color difference.

13. The computer-implemented method of claim 1, further comprising:
respectively repeating each step of claim 1 for a plurality of pixels of the subsequent image to form a plurality of optical flow vectors respectively associated with the plurality of pixels; and
aggregating the plurality of optical flow vectors to form an optical flow field.

14. The computer-implemented method of claim 13, further comprising detecting an edge within the subsequent image based upon discontinuities in the optical flow field.

15. A computer-implemented method of forming an optical flow vector describing estimated displacement of a subject pixel from an initial image to a subsequent image, the method comprising:

obtaining nine input color vectors respectively associated with nine input pixels at positions $(x_m, y_n)$, $(x_m+1, y_n)$, $(x_m+1, y_n+1)$, $(x_m, y_n+1)$, $(x_m-1, y_n+1)$, $(x_m-1, y_n)$, $(x_m-1, y_n-1)$, $(x_m, y_n-1)$, and $(x_m+1, y_n-1)$ of the initial image;

obtaining a subject color vector associated with the subject pixel, the subject pixel residing at a subject position $(x_m, y_n)$ of the subsequent image;

performing inverse bilinear interpolation for the subject color vector with respect to a first set of input color vectors to obtain a first estimated position, the first set of input color vectors comprising the four input color vectors respectively associated with the four input pixels at positions $(x_m, y_n)$, $(x_m+1, y_n)$, $(x_m, y_n+1)$, and $(x_m+1, y_n+1)$ of the initial image;

performing inverse bilinear interpolation for the subject color vector with respect to a second set of input color vectors to obtain a second estimated position, the second set of input color vectors comprising the four input color vectors respectively associated with the four input pixels at positions $(x_m, y_n)$, $(x_m-1, y_n)$, $(x_m, y_n+1)$, and $(x_m-1, y_n+1)$ of the initial image;

performing inverse bilinear interpolation for the subject color vector with respect to a third set of input color vectors to obtain a third estimated position, the third set of input color vectors comprising the four input color vectors respectively associated with the four input pixels at positions $(x_m, y_n)$, $(x_m-1, y_n)$, $(x_m, y_n-1)$, and $(x_m-1, y_n-1)$ of the initial image;

performing inverse bilinear interpolation for the subject color vector with respect to a fourth set of input color vectors to obtain a fourth estimated position, the fourth set of input color vectors comprising the four input color vectors respectively associated with the four input pixels at positions $(x_m, y_n)$, $(x_m+1, y_n)$, $(x_m+1, y_n-1)$, and $(x_m+1, y_n-1)$ of the initial image;

generating a final estimated position based on at least one of the first, second, third, and fourth estimated positions; and forming the optical flow vector from the final estimated position to the subject position.

16. The computer-implemented method of claim 15, wherein generating a final estimated position based on at least one of the first, second, third, and fourth estimated positions comprises:

performing bilinear interpolation for each of the first, second, third, and fourth estimated positions to generate a plurality of estimated color vectors;

respectively subtracting the subject color vector from each of the plurality of estimated color vectors from to a plurality of color differences; and selecting the estimated position associated with the color difference of smallest magnitude as the final estimated position.

17. The computer-implemented method of claim 15, wherein generating a final estimated position based on at least one of the first, second, third, and fourth estimated positions comprises:

determining which of a first, second, third, or fourth quadrant contains two or more of the first, second, third, or fourth estimated positions, the first, second, third, and fourth quadrants being respectively defined by the input pixel positions respectively associated with the first, second, third, and fourth set of input color vectors; and selecting the estimated position that results from inverse bilinear interpolation using the set of input color vectors associated with the quadrant containing two or more of the first, second, third, or fourth estimated positions.

18. The computer-implemented method of claim 15, wherein performing inverse bilinear interpolation for the subject color vector with respect to each set of input color vectors further comprises determining if each estimated position is an invalid result of dividing by zero or is not a number.

19. The computer-implemented method of claim 15, further comprising offsetting the final estimated position to a global frame associated with the initial image prior to forming the optical flow vector from the final estimated position to the subject position.

20. A computer-based system for generating a plurality of optical flow fields depicting optical flow with respect to a plurality of sequential images, the system comprising a computing device having a memory and a processor, the computing device being configured to:

obtain, for each of the plurality of sequential images, a plurality of color vectors respectively associated with a plurality of pixels, the plurality of pixels respectively residing at a plurality of pixel positions;

perform, at each sequential image, inverse bilinear interpolation for each of the plurality of color vectors of the image with respect to at least four of the plurality of color vectors of a previous sequential image to respectively obtain a plurality of estimated positions for the plurality of pixels;

generate, at each sequential image, a plurality of optical flow vectors respectively relating the plurality of estimated positions to the plurality of pixel positions; and aggregate, at each sequential image, the plurality of optical flow vectors to generate an optical flow field such that the plurality of optical flow fields are generated.

21. The computer-based system of claim 20, wherein the computing device is configured to perform, at each sequential image, inverse bilinear interpolation for each of the plurality of color vectors of the image with respect to at least four of the plurality of color vectors of the previous sequential image by performing operations comprising minimizing, for each of the plurality of color vectors of the image, a least-squares error equation, each least-squares error equation respectively comprising the dot product of an error function with itself, each error function respectively comprising the corresponding color vector subtracted from a bilinear interpolant, each bilinear interpolant respectively bilinearly interpolating the corresponding at least four of the plurality of color vectors of the previous sequential image with respect to a variable position.

22. The computer-based system of claim 20, wherein each of the plurality of color vectors comprises three components respectively corresponding to a red intensity component, a green intensity component, and a blue intensity component.

23. The computer-based system of claim 20, wherein each of the plurality of color vectors comprises at least three pseudo-color components respectively obtained by multiplying, element-wise, and summing over the elements a grouping of four preprocessing pixels by at least three pseudo-color conversion matrices.

24. The computer-based system of claim 20, wherein the computing device is further configured to average each sequential image with the subsequent sequential image such that a plurality of averaged sequential images are formed; and
    wherein inverse bilinear interpolation is performed and the plurality of optical flow vectors are generated and aggregated at each averaged sequential image.

25. The computer-based system of claim 20, wherein the computing device is further configured to time slice the plurality of sequential images such that a plurality of time sliced sequential images are formed; and
    wherein inverse bilinear interpolation is performed and the plurality of optical flow vectors are generated and aggregated at each time sliced sequential image.

26. The computer-based system of claim 20, wherein the computing device is further configured to generate a tracking offset based on the plurality of optical flow fields.

27. The computer-based system of claim 26, wherein the computing device is further configured to angularly displace an opto-mechanical system based on the tracking offset.

28. The computer-based system of claim 26, wherein the computing device is further configured to computationally shift each of the plurality of sequential images based on the tracking offset such that optical flow is reduced.

29. A computer-implemented method of estimating a position of a subject pixel within a first image, the subject pixel residing at a known subject position of a second image, the method comprising:
    obtaining four input color vectors respectively associated with four input pixels at four known input positions of the first image;
    obtaining a subject color vector associated with the subject pixel; and
    performing inverse bilinear interpolation for the subject color vector with respect to the four input color vectors to estimate the position of the subject pixel within the first image.

30. The computer-implemented method of claim 29, wherein performing inverse bilinear interpolation for the subject color vector with respect to the four input color vectors comprises computing an iterative algorithm to reduce an error equation below a threshold value, the error equation comparing the subject color vector to a bilinear interpolant, the bilinear interpolant bilinearly interpolating the four input color vectors with respect to a variable position.

* * * * *